(12) United States Patent
Morfouace et al.

(10) Patent No.: US 6,419,266 B1
(45) Date of Patent: Jul. 16, 2002

(54) PROTECTIVE ASSEMBLY FITTED WITH AN EXPANDING EXTERNAL DEFLECTOR

(75) Inventors: Vincent Morfouace, Melun; Philippe Suzanne, Bouicourt, both of (FR)

(73) Assignee: Livbag SNC, Vert le Petit (FR)

( * ) Notice: Subject to any disclaimer, the term of this patent is extended or adjusted under 35 U.S.C. 154(b) by 0 days.

(21) Appl. No.: 09/546,538

(22) Filed: Apr. 10, 2000

(30) Foreign Application Priority Data

Apr. 20, 1999 (FR) .............................. 99 04971

(51) Int. Cl.⁷ .............................................. B60R 21/28
(52) U.S. Cl. ..................................................... 280/740
(58) Field of Search ................................. 280/740, 741

(56) References Cited

U.S. PATENT DOCUMENTS

| | | | |
|---|---|---|---|
| 3,618,976 A | | 11/1971 | Leising ................. 280/150 AB |
| 3,799,573 A | * | 3/1974 | McDonald ................... 280/740 |
| 4,068,862 A | * | 1/1978 | Ishi et al. .................... 280/740 |
| 4,178,017 A | | 12/1979 | Ishi et al. .................... 280/740 |
| 5,149,130 A | | 9/1992 | Wooley et al. .............. 280/743 |
| 5,340,147 A | | 8/1994 | Fontecchio et al. ..... 280/728 A |
| 5,752,715 A | * | 5/1998 | Pripps et al. ............... 280/740 |
| 5,873,598 A | * | 2/1999 | Yoshioka et al. ........... 280/740 |
| 6,126,192 A | * | 10/2000 | Enders .................... 280/728.2 |

FOREIGN PATENT DOCUMENTS

| | | |
|---|---|---|
| DE | 196 26 463 A | 1/1998 |
| EP | 0 844 149 A1 | 5/1998 |
| GB | 2 320 470 A | 6/1998 |

OTHER PUBLICATIONS

"Deformable Diffuser for an Air Bag Module", Research Disclosure, GB, Industrial Opportunities LTD.; Havant, No. 391, Nov. 1, 1996, pp. 687–688.
Patent Abstracts of Japan; vol. 1997, No. 07, Jul. 31, 1997.

* cited by examiner

*Primary Examiner*—Eric Culbreth
*Assistant Examiner*—L. Lum
(74) *Attorney, Agent, or Firm*—Oliff & Berridge, PLC

(57) ABSTRACT

The invention relates to a protective assembly used in the field of motor vehicle safety to protect an occupant of a motor vehicle in the event of a collision.

The protective assembly comprises a module itself containing a gas generator, an external deflector and an air bag initially folded around the generator, characterized in that:

i) the generator comprises a body of tubular overall shape which has a side wall bearing discharge orifices distributed around the circumference of the side wall, the latter having a circular cross section, the outside perimeter of which has a length L, ii) the external deflector can expand and is made using a metal strip which is 2L long, iii) the discharge orifices are initially covered by the expanding external deflector which closely surrounds the side wall.

14 Claims, 4 Drawing Sheets

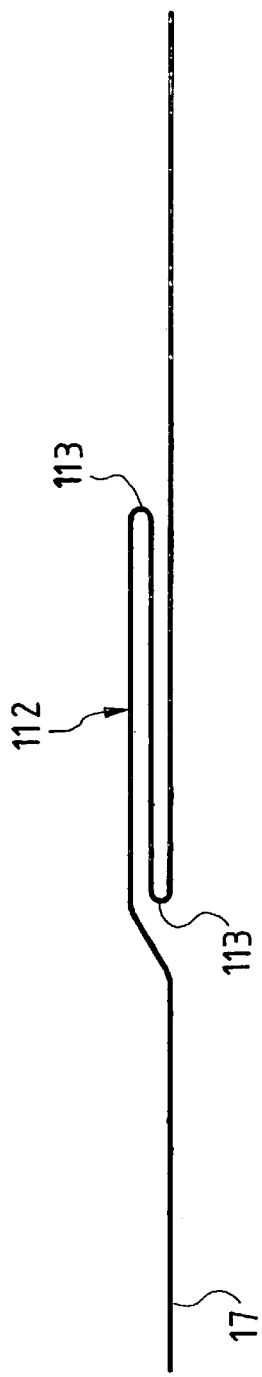
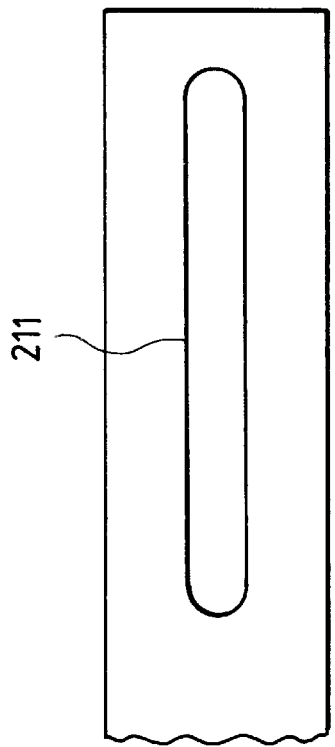
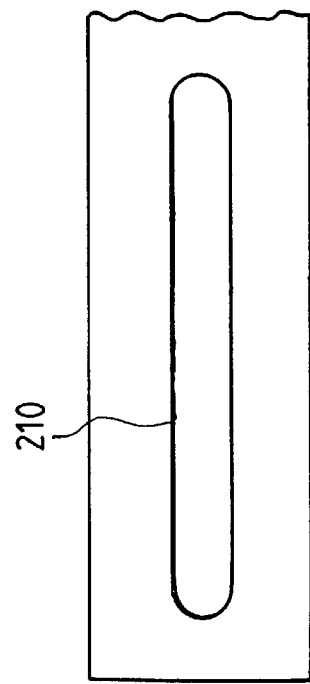
FIG. 7
FIG. 8

PROTECTIVE ASSEMBLY FITTED WITH AN EXPANDING EXTERNAL DEFLECTOR

BACKGROUND OF THE INVENTION

1. Field of the Invention

The present invention relates to the field of motor vehicle safety and relates more particularly to a protective assembly comprising a module itself containing a gas generator, an external deflector and an air bag.

2. Description of Related Art

In order to limit as far as possible the risk of physical injury run by the occupants of a motor vehicle in the event of a frontal or side impact, it has been proposed for the past thirty or so years that gas-generating systems be incorporated into the motor vehicles to inflate frontal or side protective air bags. However, these generators, which are becoming ever more powerful while at the same time retaining a small external size, generally emit insufficiently filtered jets of gas which come into direct contact with the air bag and convey very hot particles which may damage the air bag.

It has therefore been proposed that external deflectors be associated with these various gas generators so as to deflect the path of the gas jets and therefore reduce their aggression towards the air bags. U.S. Pat. No. 3,618,976 describes a cylindrical gas generator more especially used to inflate an air bag intended to protect the driver of a motor vehicle and which comprises a central orifice for discharging the gases which originate from the combustion of a pyrotechnic charge, this central orifice, located on a flat face of the generator, being of rectangular shape and surmounted by a non-deformable deflector, itself borne by an expanding filter, also of rectangular shape, which is riveted and initially folded around the said central orifice. An air bag is positioned over the generator and contains the non-deformable deflector. However, the latter, aside from the fact that it leads to a relatively high production cost and an excessive external size, can be used only with a gas generator of a certain type as described in the said patent and cannot therefore be associated with a generator of tubular shape equipped with peripheral gas discharge orifices. U.S. Pat. No. 5,340,147 discloses a protective assembly containing a gas generator of tubular overall shape with gas outlets distributed around the entire length of the cylindrical wall of the generator and around which a non-deformable external deflector is fixed, this deflector itself being contained in a diffuser which is partially expandible and of tubular overall shape. This protective assembly is made using many mechanical parts which are difficult to machine, thus giving the latter a high cost of manufacture and a high mass and large external size, which is highly penalizing in a competitive market such as that of motor vehicle safety. European patent application EP 0,844,149 describes a protective assembly comprising a cylindrical gas generator of short height by comparison with its diameter and used more especially to inflate an air bag intended to protect the driver of a motor vehicle. A non-deformable external deflector is placed around the generator and allows the jets of hot gases to be deflected.

The need for tubular generators which are very long by comparison with their diameter is ever growing at the present time because of the proliferation of protective devices for passengers, these devices calling exclusively upon this type of generator. Now, the person skilled in the art does not have any external deflector of small size and which is inexpensive to manufacture for this type of generator.

SUMMARY OF THE INVENTION

A first object of the invention is to produce a protective assembly containing a gas generator of tubular overall shape, with which there is associated an external deflector, the external size of which is small.

Another object of the invention is to produce a protective assembly of this type which has a low cost of manufacture.

An assembly for protecting an occupant of a motor vehicle comprises, according to the invention, a module itself containing a gas generator, an external deflector and an air bag initially folded around the said gas generator, characterized in that:

i) the gas generator comprises a body which has two ends and a side wall bearing discharge orifices distributed around the circumference of the said side wall, the latter having a circular cross section, the outside perimeter of which has a length L, ii) the external deflector consists of a single expanding element, iii) the discharge orifices are initially covered by the expanding external deflector which closely surrounds the side wall.

As a preference, the expanding external deflector is made using a deformable metal strip which is between 1.5 L and 2.5 L long. Also as a preference, the strip is between 0.1 mm and 0.5 mm thick.

Advantageously, the deformable strip has at least one expanding region intended to be deployed under the action of the gases released by the generator. This expanding region may be produced by folding the strip or alternatively by rolling the strip up on itself.

According to a first alternative form of the expanding external deflector, the expanding region is obtained by folding the strip in at least four symmetric folds, each fold being folded at an angle of 180° and with a minimum radius of 0.2 mm.

According to a second alternative form of the expanding external deflector, the expanding region is obtained by folding the strip in at least two asymmetric folds, each fold being folded at an angle of 180° and with a minimum radius of 0.2 mm.

A protective assembly as described hereinabove therefore does indeed afford a solution to the aforeset problems because:

- the use of an expanding external deflector which initially closely surrounds the side wall of the generator allows the subassembly consisting of the said generator and the said deflector to be given an external size which is practically similar to that of the generator.
- the use of a simple metal strip of negligible mass from which to make the expanding external deflector allows manufacturing and assembly costs to be greatly reduced.

Advantageously, the strip is coated with anti-corrosion protection.

Advantageously too, the discharge orifices are located in a region which is equidistant from the ends of the body of the generator. In order to reduce the number of stages needed in assembling the protective assembly, the gas generator, the expanding external deflector and the air bag are attached to the module using a common fastener. As a preference, the latter consists of a threaded shank fixed into the side wall of the generator and on which a nut is fitted.

One embodiment of a protective assembly according to the invention is described hereinafter in FIGS. 1 to 4, and FIGS. 5 to 8 give examples of the metal strip used to manufacture the expanding external deflector.

BRIEF DESCRIPTION OF THE DRAWINGS

FIG. 7 is a part view in longitudinal section of the strip depicted in FIG. 5 according to the second preferred alternative form of the expanding external deflector.

FIG. 8 is a part view from above of the metal strip used to manufacture an expanding external deflector by rolling it up on itself.

DETAILED DESCRIPTION OF PREFERRED EMBODIMENTS

Figure 1:
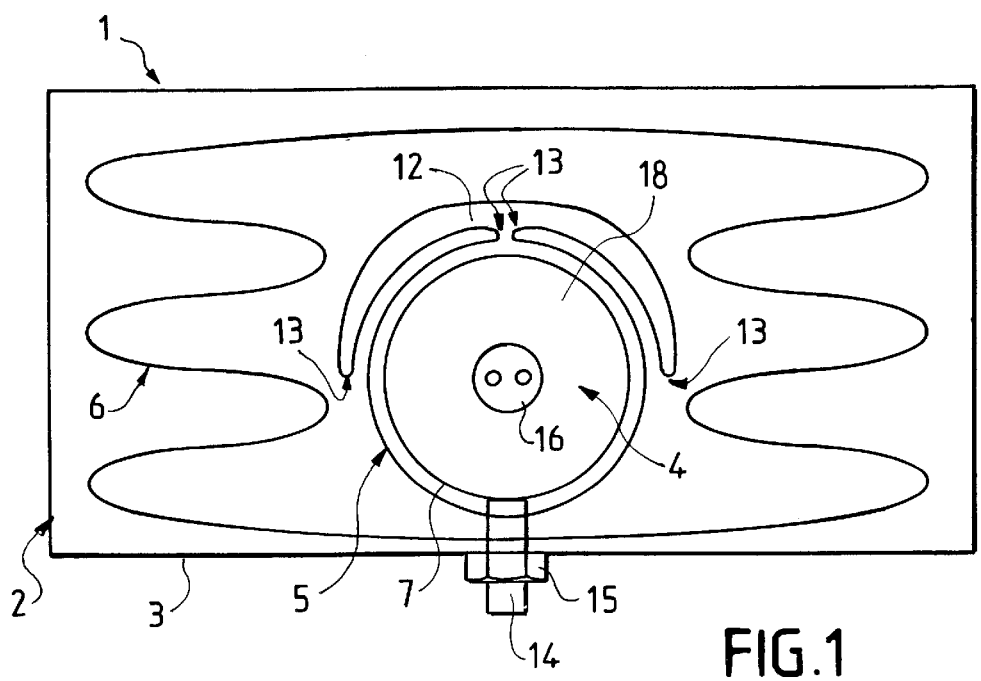
FIG. 1 is a diagrammatic view of a protective assembly according to the invention prior to functioning, and viewed from one end of the generator.
Figure 2:
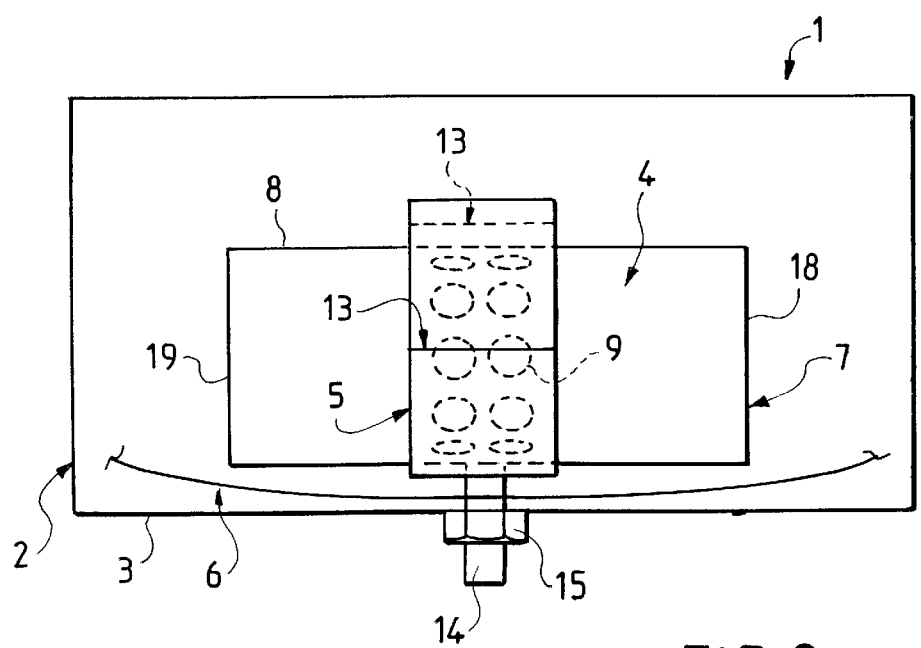
FIG. 2 is a diagrammatic part view of the protective assembly depicted in FIG. 1, viewed along the generatrices of the generator.

Referring to FIGS. 1 and 2, it may be seen that a protective assembly 1 according to the invention is made up of a module 2 with a closed end 3 to which a subassembly comprising a gas generator 4, an expanding external deflector 5 and an air bag 6 is attached.

More specifically, the generator 4 comprises a body 7 of tubular overall shape with two ends 18, 19 and a side wall 8, the external perimeter of which has a length L. This side wall 8 has, in a region equidistant from the ends 18, 19, on the one hand, gas discharge orifices 9 uniformly distributed around the circumference of the said side wall 8 and, on the other hand, a threaded shank 14 with one end welded into the said side wall 8. The generator 4 also has an igniter device 16 fixed into the end 18 of the body 7.

Figure 5:
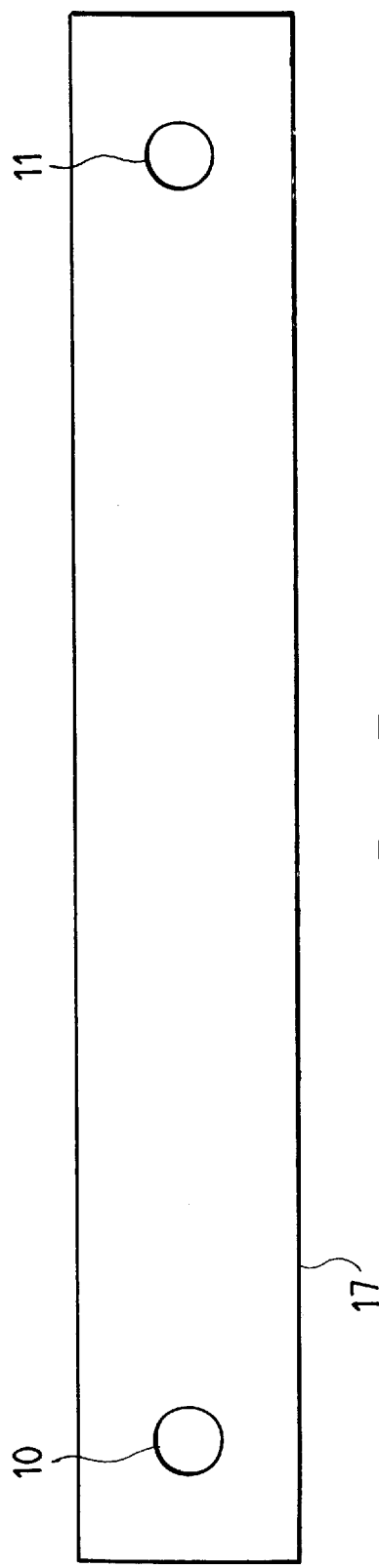
FIG. 5 is a view from above of the metal strip used to manufacture an expanding external deflector by folding.
Figure 6:
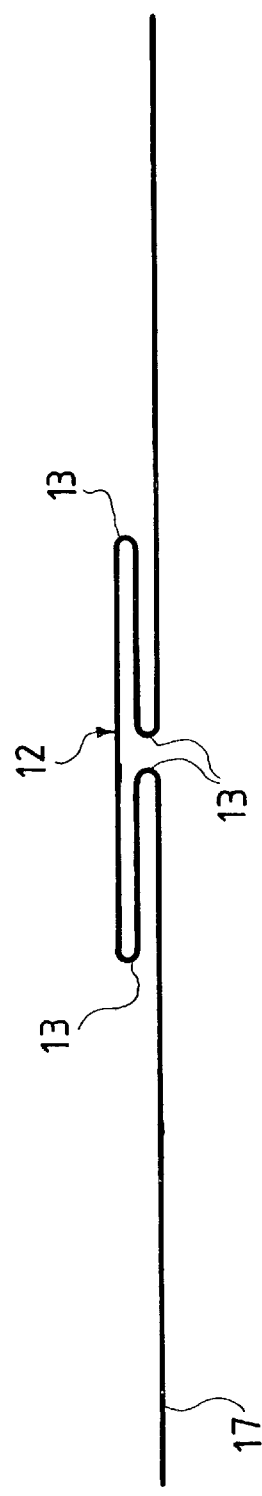
FIG. 6 is a part view in longitudinal section of the strip depicted in FIG. 5 according to the first preferred alternative form of the expanding external deflector.

Referring also to FIGS. 5 and 6, it may be seen that the expanding external deflector 5 is made from a strip 17 of tin plate of length 2 L and approximately 0.25 mm thick. This strip 17 has a circular perforation 10 located approximately 5 mm from the first end of the said strip 17 and a circular perforation 11 also located approximately 5 mm from the second end of the said strip 17. Before being positioned around the generator 4, the strip 17 is first of all folded four times symmetrically so that a central expanding region 12 is formed, each of the four folds 13 being made at an angle of 180° and with a minimum radius of 0.2 mm. The strip 17 is then pressed into a cylindrical overall shape with the circular perforations 10 and 11 superposed. The expanding external deflector 5 thus formed is finally fitted as close as possible to the generator 4, so that it completely covers the discharge orifices 9 and is held firmly in this position by virtue of the superposed circular perforations 10 and 11 which are slipped along the threaded shank 14.

The generator 4 and the expanding external deflector 5 thus connected together are then introduced into the air bag 6. The latter, which is known to those skilled in the art, has fastening regions, each equipped with an orifice, on the opposite face of the bag to the face which is intended to come into contact with the occupant. Each of these fastening regions is finally slipped along the threaded shank 14 via the orifice it has.

Finally, the subassembly consisting of the generator 4, the expanding external deflector 5 and the air bag 6 is attached to the module 2 by virtue of the threaded shank 14 which is inserted into a nozzle exhibited by the closed end 3 and on which a nut 15 is screwed.

Figure 3:
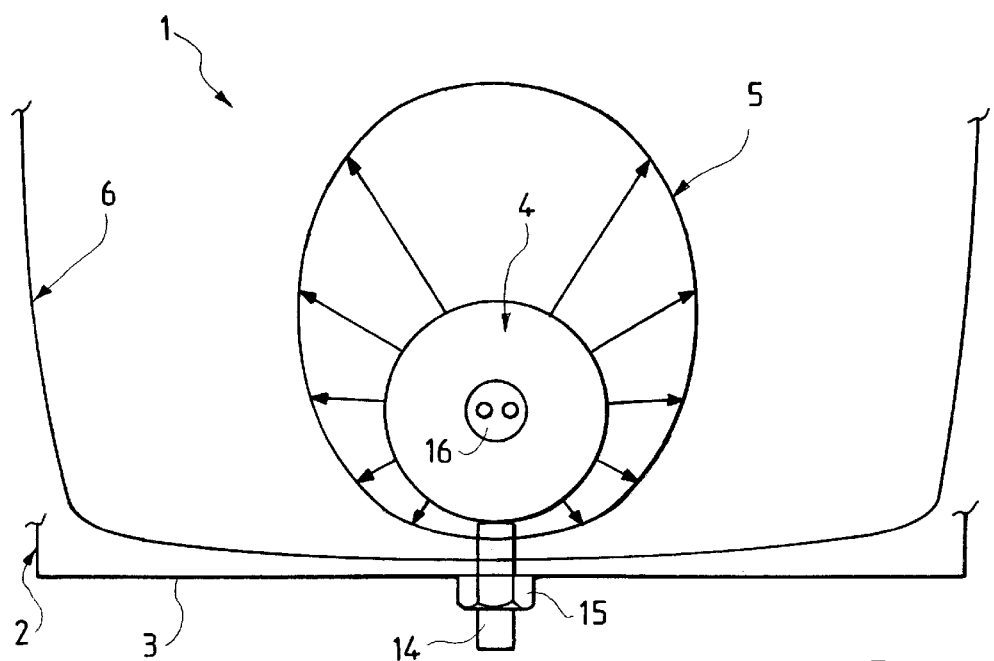
FIG. 3 is a diagrammatic part view of the protective assembly depicted in FIG. 1, but while it is functioning.
Figure 4:
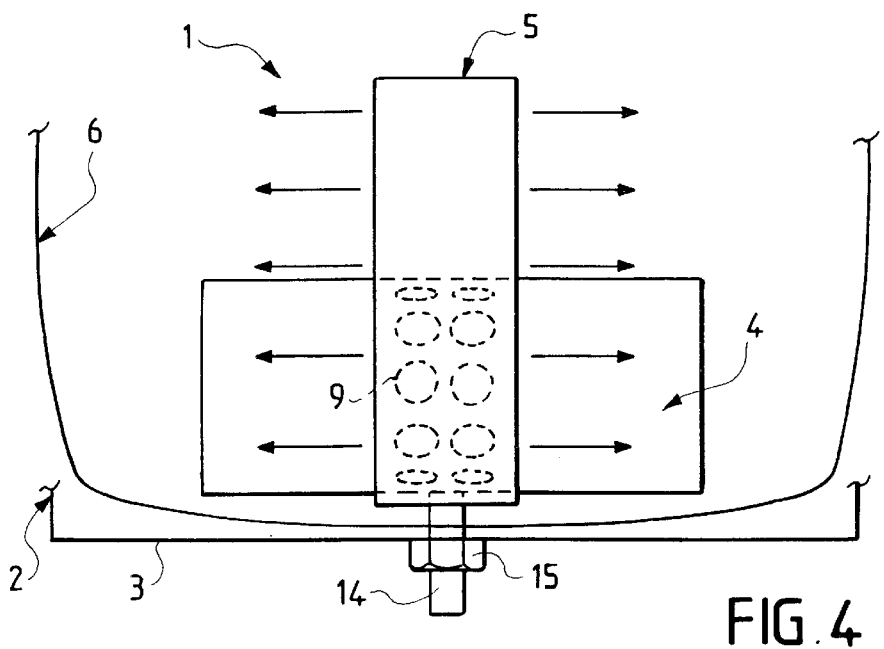
FIG. 4 is a diagrammatic part view of the protective assembly depicted in FIG. 2, but while it is functioning.

As depicted in FIGS. 3 and 4, the way in which a protective assembly 1 of this kind functions is as follows. In the event of a collision which requires the deployment of the air bag 6 in order to afford effective protection to the occupant of the motor vehicle, an initiation command is transmitted to the igniter device 16 and therefore causes the generator 4 to operate. This generator then generates gases intended to inflate the air bag 6, these gases escaping via the discharge orifices 9. These gases immediately exert such pressure on the expanding external deflector 6, and in particular on the central expanding region 12, that they force this deflector to fully deploy so as to form an annulus, the diameter of which is markedly greater than that of the side wall 8 of the body 7. The gases from the generator 4 are therefore forced, initially, to come into contact with the expanding external deflector 5 and then to inflate the air bag 6 uniformly once they have reflected off the said expanding external deflector 5.

FIG. 7 depicts a part view in longitudinal section of the strip 17 according to the second preferred alternative form of an expanding external deflector. The strip 17 is in fact folded twice asymmetrically, so that an expanding region 112 is formed, each of the two folds 113 being folded at an angle of 180° and with a minimum radius of 0.2 mm. In operation, the expanding external deflector thus manufactured behaves in the same way as the expanding external deflector 5 described previously.

FIG. 8 depicts a strip 217 that can be used to manufacture an expanding external deflector simply by rolling the strip 217 around the generator. This strip 217 has the feature of having very long oblong perforations 210 and 211 which are intended, under the action of the gases released by the generator, to slide along the threaded shank and thus allow the expanding external deflector to deploy.

What is claimed is:

1. An assembly for protecting an occupant of a motor vehicle, comprising:

a gas generator comprising a body which has two ends and a side wall bearing discharge orifices distributed around the side wall, the side wall having a circular cross section and an outside circumference with a length L;

an air bag initially folded around the gas generator; and an external deflector comprising a single expanding element, for deflecting gases released from the gas generator throughout the air bag during inflation, wherein, the discharge orifices are initially covered by the external deflector which closely surrounds the side wall, the external deflector is made using a deformable metal strip which is between 1.5L and 2.5L long, the deformable metal strip has at least one expanding region intended to be deployed when the gases are released by the generator and the expanding region is obtained by folding the strip in at least four symmetric folds, each fold being folded at an angle of 180° and with a minimum radius of 0.2 mm.

2. The assembly according to claim 1, characterized in that the strip is between 0.1 mm and 0.5 mm thick.

3. The assembly according to claim 1, characterized in that the strip is coated with anti-corrosion protection.

4. The assembly according to claim 1, characterized in that the discharge orifices are located in a region which is equidistant from the ends of the body.

5. The assembly according to claim 4, characterized in that the gas generator, the external deflector and the air bag are attached to a module using a common fastener.

6. The assembly according to claim 5, characterized in that the fastener consists of a threaded shank fixed into the side wall and on which a nut is fitted.

7. The assembly according to the claim 1, wherein the gas is released toward the occupant from the gas generator.

8. An assembly for protecting an occupant of a motor vehicle, comprising:

a gas generator comprising a body which has two ends and a side wall bearing discharge orifices distributed around the side wall, the side wall having a circular cross section and an outside circumference with a length L;

an air bag initially folded around the gas generator; and an external deflector comprising a single expanding element, for deflecting gases released from the gas generator throughout the air bag during inflation, wherein, the discharge orifices are initially covered by the external deflector which closely surrounds the side wall, the external deflector is made using a deformable metal strip which is between 1.5L and 2.5L long, the deformable metal strip has at least one expanding region intended to be deployed when the gases are released by the generator and the expanding region is obtained by folding the strip in at least two asymmetric folds, each fold being folded at an angle of 180° and with a minimum radius of 0.2 mm.

9. The assembly according to claim 8, characterized in that the strip is between 0.1 mm and 0.5 mm thick.

10. The assembly according to claim 8, characterized in that the strip is coated with anti-corrosion protection.

11. The assembly according to claim 8, characterized in that the discharge orifices are located in a region which is equidistant from the ends of the body.

12. The assembly according to claim 11, characterized in that the gas generator, the external deflector and the air bag are attached to a module using a common fastener.

13. The assembly according to claim 12, characterized in that the fastener consists of a threaded shank fixed into the side wall and on which a nut is fitted.

14. The assembly according to the claim 8, wherein the gas is released toward the occupant from the gas generator.

* * * * *